1
UNITED STATES PATENT OFFICE.

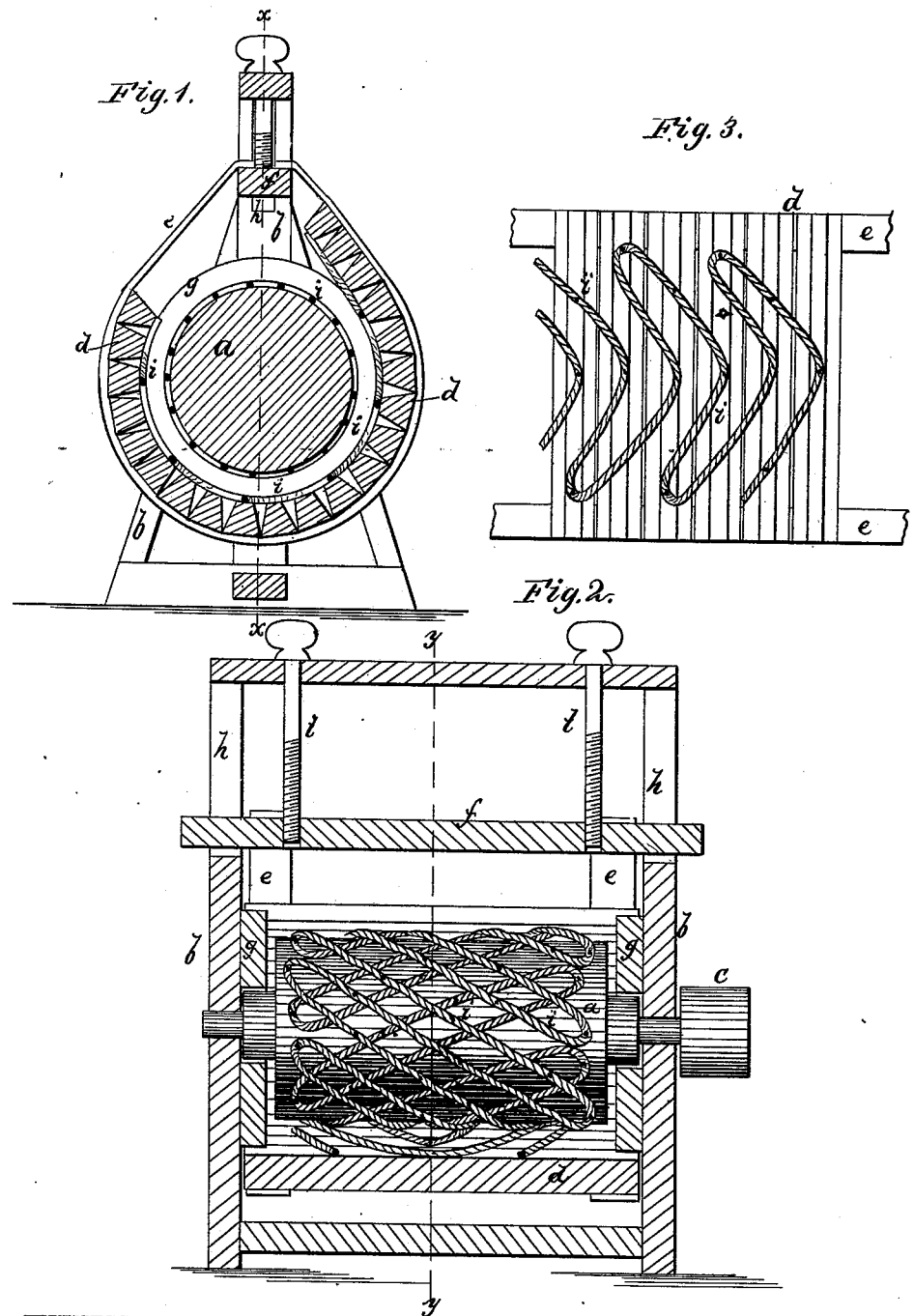

JOHN G. MEEKER, OF DANBURY, CONNECTICUT.

IMPROVEMENT IN MACHINES FOR FELTING AND HARDENING HAT-BODIES AND OTHER FABRICS.

Specification forming part of Letters Patent No. 215,144, dated May 6, 1879; application filed October 8, 1878.

*To all whom it may concern:*

Be it known that I, JOHN G. MEEKER, of Danbury, in the county of Fairfield and State of Connecticut, have invented new and useful Improvements in Machines for Felting and Hardening Hat-Bodies and other Fabrics, of which the following is a specification.

The invention consists in forming ribs of hempen rope upon the opposite working faces of the felting-roll and apron of a machine for felting and hardening hat-bodies, as hereinafter more fully described.

In the accompanying drawings, Figure 1 is a cross-section of my improved machine at right angles to the axis of the felting-roller. Fig. 2 is a vertical longitudinal section, the felting-roller being in elevation; and Fig. 3 is an elevation of a portion of the flexible apron, showing the inner side.

Similar letters of reference indicate corresponding parts.

$a$ is a roller journaled in the frame $b$ of the machine, and having a pulley, $c$, for connection by a belt to power, so that the roller will be revolved. $d$ is the apron surrounding roller $a$, except at one point at the upper side, which is left open for the insertion of the article to be operated upon. The apron $d$ is composed of slats, as shown, held together by a surrounding rigid strap, $e$, at each end, and the straps $e$ extend up and are connected to the bar $f$ of frame $b$, so as to retain the apron $d$ in place. $g\ g$ are circular heads around the shaft of roller $a$, and attached to frame $b$. The apron $d$ rests upon the heads $g$, and direct contact of the roller $a$ and apron $d$ is thereby prevented. The bar $f$ is fitted to move vertically in slots $h$, that are formed in the frame of the machine, and its position can be regulated by the screw-rods $l$, and the distance between roller $a$ and apron $d$ thereby adjusted to regulate the pressure upon the hat-bodies.

The surface of roller $a$ and apron $d$ is ribbed, as shown at $i$, these ribs being formed by small hempen rope attached by nails or pegs. The rope is applied by preference in the manner shown, the lines upon the roller running diagonally and crossing each other, and upon the apron the lines are parallel, inclining from the center upward or downward toward the sides of the apron.

The ribbed surfaces formed by the rope act efficiently in felting the hat-bodies or other fabrics placed in the machine. They have the required flexibility or elasticity to form a substitute for the hand-manipulation usually employed, and may be successfully employed for the work which rigid corrugations fail to perform.

The machine above described, when in use for felting, will be placed in a suitable box for containing hot water; but for hardening the bodies water will not be used.

I do not limit myself to the exact manner shown of arranging the rope to form the ribbed surfaces; neither do I limit myself to the use of rope, as any material which will furnish the characteristic features of the rope ribs may be used for the same purpose.

I am aware that it is not new to use a corrugated cylinder with a flexible slatted apron; but the corrugations being hard and rigid the felting operation is imperfectly performed.

What I claim as new and of my invention is—

A machine for felting or hardening hat-bodies in which the opposite working faces of the apron and felting-roll are provided with rope ribs, substantially as and for the purpose specified.

JOHN G. MEEKER.

Witnesses:
TIMOTHY JONES,
DANIEL W. MEEKER.